United States Patent [19]

Gleffe et al.

[11] Patent Number: 5,242,255
[45] Date of Patent: Sep. 7, 1993

[54] RE-USABLE TRANSPORT AND PACKAGING DEVICE

[75] Inventors: Klaus Gleffe, Taunusstein-Wehen; Thomas Heusel, Wiesbaden; Helmut Reichert, Geisenheim-Johannisberg, all of Fed. Rep. of Germany

[73] Assignee: Hoechst Aktiengesellschaft, Frankfurt am Main, Fed. Rep. of Germany

[21] Appl. No.: 718,777

[22] Filed: Jun. 21, 1991

[30] Foreign Application Priority Data

Jun. 22, 1990 [DE] Fed. Rep. of Germany ....... 9006966

[51] Int. Cl.⁵ ............................................. B65D 19/44
[52] U.S. Cl. ..................... 414/403; 410/48; 108/53.1; 206/600; 211/195
[58] Field of Search ............ 414/403; 410/47, 48, 410/49, 50; 108/51.1, 53.1, 53.3, 55.1, 55.5; 206/600; 211/44, 60.1, 195; 248/166

[56] References Cited

U.S. PATENT DOCUMENTS

| | | | |
|---|---|---|---|
| 2,956,763 | 10/1960 | D'Arca | 108/53.1 |
| 3,084,803 | 4/1963 | Bayers | 410/48 X |
| 3,355,029 | 11/1967 | Eurey | 211/44 |
| 3,430,773 | 3/1969 | Hancock | 211/44 X |
| 3,602,368 | 8/1971 | Gould | 108/55.1 X |
| 3,804,033 | 4/1974 | Izawa et al. | 108/55.1 X |
| 3,946,876 | 3/1976 | Jay | 211/195 X |
| 4,098,409 | 7/1978 | Massey | 211/195 |
| 4,884,690 | 12/1989 | Klenter et al. | 206/416 |

FOREIGN PATENT DOCUMENTS

| | | | |
|---|---|---|---|
| 46250 | 9/1932 | Denmark | 108/55.1 |
| 0029750 | 6/1981 | European Pat. Off. | |
| 8326343.8 | 1/1984 | Fed. Rep. of Germany | |
| 3808064 | 3/1989 | Fed. Rep. of Germany | |

Primary Examiner—Michael S. Huppert
Assistant Examiner—James T. Eller, Jr.
Attorney, Agent, or Firm—Foley & Lardner

[57] ABSTRACT

A device for the careful and gentle transport of mechanically sensitive goods in the form of rolls comprises a rectangular base frame and supporting elements 2, 2', which can be pivoted down onto the base frame. By use of joints 6, 6', the supporting elements 2, 2' can be pivoted down onto the base frame from their vertical position, through an angle of 90°, relative to the base frame. Holding elements 3, 3', which receive the shaft ends of goods in the form of rolls, are arranged centrally, relative to the transverse sides of the base frame, on transverse struts of the supporting elements.

11 Claims, 2 Drawing Sheets

RE-USABLE TRANSPORT AND PACKAGING DEVICE

BACKGROUND OF THE INVENTION

The present invention relates to a re-usable transport and packaging device for the careful and gentle transportation of mechanically sensitive materials in the form of rolls.

German Patent Publication No. DE-C-38 08 064 discloses transport and packaging aids with which, by means of so-called end walls, cylindrical goods, e.g., automatically produced rolls of sheet-like materials, such as paper, woven fabrics, metal foils or plastic films, are given a more readily stackable or easy-to-handle form in order to be capable of transporting the materials from the producer to another facility such as a finishing plant without substantial mechanical damage to the material. It is true that these packaging aids are quite effective, but they require the use of relatively voluminous packaging materials which are thrown away after having been used one single time or, in some cases, a few times, and hence they cause considerable problems in respect of waste dumping or disposal, because they are employed in great numbers. Both producers and users of packaging goods would like to overcome these problems by no longer employing packagings of this type or by at least rendering them re-usable.

OBJECTS AND SUMMARY OF THE INVENTION

It is an object of the instant invention to provide a device by means of which full-width rolls can be transported carefully and which has as small a storing and stacking volume as possible.

In accordance with the present invention, this object is accomplished by a device having a rectangular base frame and supporting elements which are mounted on the base frame, which extend above the base frame, and which are pivotable downwardly onto the base frame. Holding elements are supported by the supporting elements and provide for stationary mounting of the rolls. The supporting elements may be connected to the base frame via joints which allow the supporting elements to pivot through an angle of 90° from a vertical working position into a stacking position in which they lie flat on the base frame.

In accordance with another aspect of the invention, spacers are provided which extend from an underside of the frame, the spacers being sufficiently long to allow the insertion of a fork stacker beneath the frame. The supporting elements, the base frame, and the spacers are made from dimensionally stable materials, preferably metal.

In accordance with a preferred aspect of the invention, the supporting elements comprise first and second supporting elements located adjacent corners of a first longitudinal end of the frame and third and fourth supporting elements located adjacent corners of a second longitudinal end of the frame. The first and third supporting elements are located adjacent a first lateral edge of the frame and are laterally offset from one another by a distance which allows the first and third supporting elements to fold down without contacting each other. The second and fourth supporting elements are located proximate a second lateral edge of the frame and are laterally offset from one another by a distance which allows the second and fourth supporting elements to fold down without contacting each other. Preferably the first supporting element is located further from the first lateral edge of the frame than the third supporting element and the fourth supporting element is located further from the second lateral edge of the frame than the second supporting element.

Another object of the invention is to provide a method of safely transporting a full-width roll of material.

According to a first aspect of the invention, the method comprises the steps of unfolding supporting elements of a transporting device from a stacking position in which they lie flat on a rectangular base frame to a working position, stationarily mounting the roll on holding elements supported by the supporting elements, and lifting and transporting the transporting device. The step of unfolding the supporting elements preferably comprises the step of pivoting the elements through an angle of 90° to a position in which they extend vertically from the frame.

In accordance with another aspect of the invention, also provided are the steps of removing the roll from the device and folding the supporting elements back into the stacking position. The folding step comprises the step of folding the supporting elements into a position in which the supporting elements lie flat on the frame without contacting one another and without extending past edges of the frame. More specifically, the folding step comprises the steps of folding first and second supporting elements mounted on opposed lateral sides of a first longitudinal end of the frame and third and fourth supporting elements mounted on opposed lateral sides of a second longitudinal end of the frame towards the second and first longitudinal ends of the frame, respectively. Additional steps include folding the first supporting element to a position laterally outside of the third supporting element, and folding the second supporting element to a position laterally inside of the fourth supporting element.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being had to the accompanying drawings in which like reference numerals represent like parts throughout, and in which.

DETAILED DESCRIPTION OF THE PREFERRED EMBODIMENTS

The preferred device comprises a rectangular base frame and supporting elements which can be pivoted down onto the base frame and which are equipped with holding elements for the stationary mounting of goods in the form of rolls.

In one embodiment of the invention, the supporting elements can be pivoted from their vertical working position through 90° onto the base frame, i.e., into their stacking position.

In a further embodiment of the invention, spacers are provided on the underside of the base frame, the length of which base frame is selected such that the device can be lifted by a device such as a fork stacker, like a pallet. The base frame, the supporting elements and the spacers are made of a dimensionally stable material, such as metal, which is not sensitive to mechanical damage.

Within the scope of this invention, the characterizing feature 'single-piece' or 'unitary' denotes that the transport and packaging device represents a unit with a plurality of interacting elements which are movable with respect to one another, but which cannot be separated from one another by a simple manual operation.

The supporting elements, which are arranged opposite one another on the transverse sides of the base frame, are preferably mutually offset by diagonally opposing, small projecting ends. Expediently, the length of the supporting elements is less than or equal to the length of the longitudinal sides of the base frame.

The holding elements are fastened to struts provided between the supporting elements, such that they are located centrally relative to the transverse sides of the base frame. The device is designed such that it can receive at least one fullwidth roll of sheet-like material. Advantageously, the base frame is reinforced by transverse struts.

Figure 1:
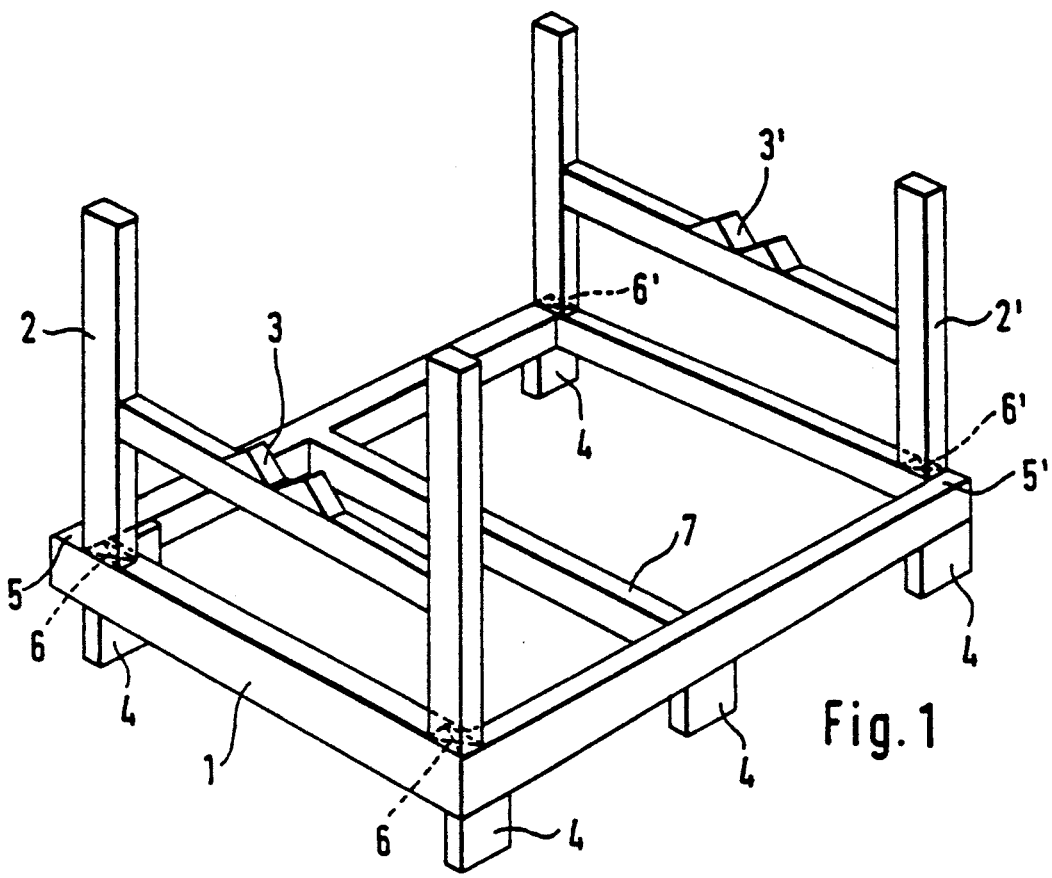
FIG. 1 shows a perspective view of a transport and packaging device according to the invention.
Figure 2:
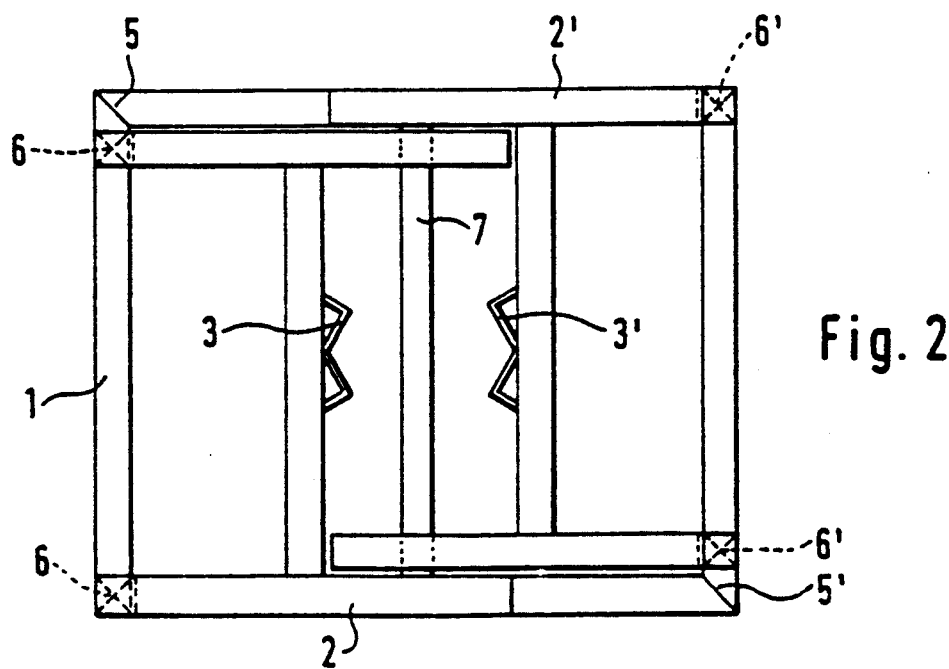
FIG. 2 shows a plan view of a folded transport and packaging device.
Figure 3:
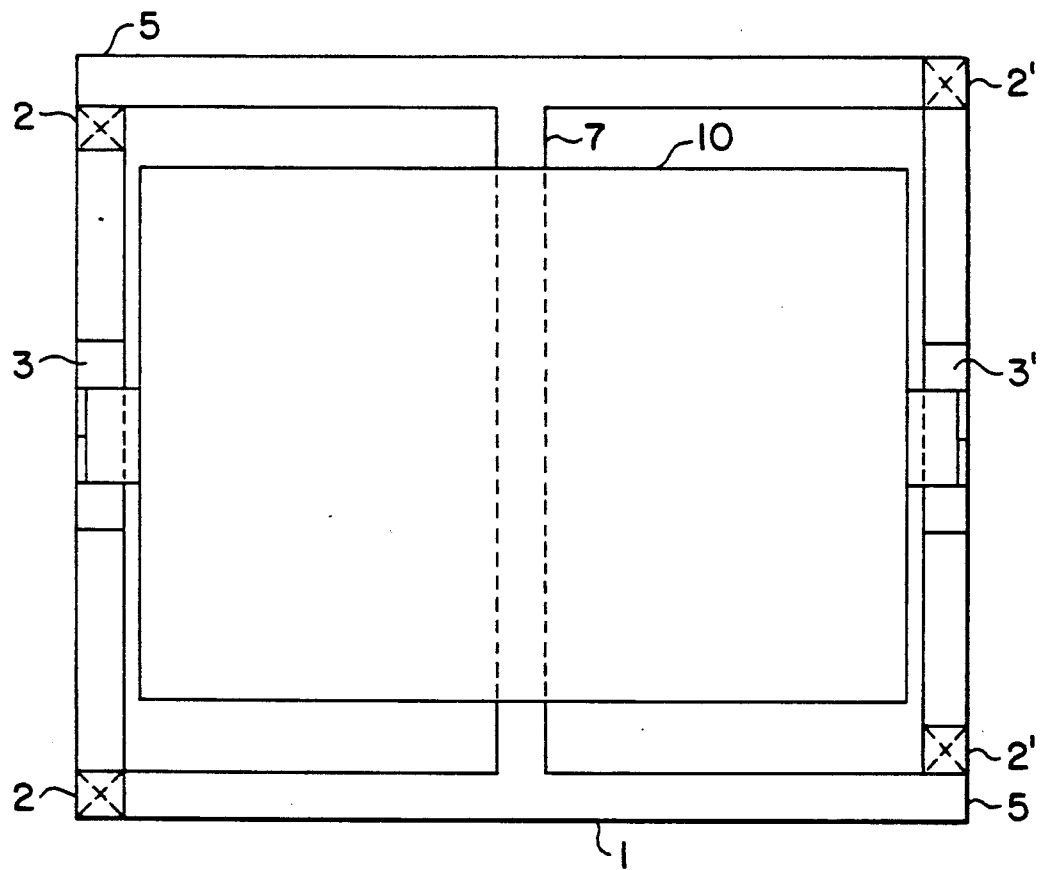
FIG. 3 shows a plan view of an unfolded transport and packaging device with a roll mounted thereon.

FIG. 1 shows a base frame 1, to the transverse sides of which supporting elements 2, 2' are fastened. Joints 6, 6', which connect the supporting elements 2, 2' to the base frame 1, are traced in broken lines. Furthermore, V-shaped holding elements 3, 3' are shown, which are arranged centrally relative to the base frame, and are mounted on transverse struts provided between supporting elements 2, 2'. FIGS. 1-3 clearly illustrate that the supporting elements 2, 2', mounted to the base frame 1, are mutually offset by projecting ends 5, 5' present on diagonally opposing ends of the base frame. Below the base frame 1, spacers 4 are provided, so that the transport and packaging device can be more easily moved and lifted by means of a suitable lifting mechanism such as a fork stacker, in a manner similar to a pallet. As illustrated in FIG. 3, a full width roll 10 can be mounted on holding elements 3 and 3' and transported when the supporting elements 2 and 2' are unfolded.

In FIG. 2, the reference numerals denote the same items as in FIG. I. Here, the joints 6, 6' can be seen clearly, by which the supporting elements 2, 2' are connected to the base frame. FIG. 2, in which the device is shown in the folded state, shows that the length of the supporting elements 2, 2' may be shorter than or equal to the length of the longitudinal sides of the base frame and that the base frame 1 is reinforced by at least one transverse strut 7. In the state shown in FIG. 2, the supporting elements 2, 2' are pivoted down onto the base frame. In their working positions, shown in FIG. 3, the supporting elements 2 and 2' are pivoted upwards through an angle of 90° and are positioned perpendicularly relative to the base frame 1, so as to support the ends of the roll core of the roll 10, to be transported in the V-shaped holding elements 3, 3'.

The supporting elements 2 and 2', the spacers 4, and the base frame 1 are made of a dimensionally stable material, e.g., a metal.

What is claimed is:

1. A re-usable transport and packaging device for transporting mechanically sensitive rolls, comprising:
   (A) a rectangular base frame having two longitudinal sides and two lateral sides, said longitudinal sides having a length greater than that of said lateral sides;
   (B) supporting elements which are mounted on said base frame, which extend above said base frame, and which are pivotable downwardly onto said base frame; and
   (C) holding elements which are supported by said supporting elements and which provide for stationary mounting of said rolls, wherein the supporting elements have a length greater than half the length of the longitudinal sides, and
   wherein said supporting elements comprise first and second supporting elements located adjacent corners of a first longitudinal end of said frame and third and fourth supporting elements located adjacent corners of a second longitudinal end of said frame, and
   wherein when said first through fourth supporting elements are pivoted downwardly onto said base frame, said first through fourth supporting elements extend in directions which are coplanar.

2. The device as claimed in claim 1, wherein said supporting elements are connected to said base frame via joints which allow said supporting elements to pivot through an angle of 90° from a vertical working position into a stacking position in which they lie flat on said base frame.

3. The device as claimed in claim 1, further comprising spacers extending from an underside of said frame, said spacers being sufficiently long to allow the insertion of a fork stacker beneath said frame.

4. The device as claimed in claim 3, wherein said frame, said supporting elements, and said spacers are made from dimensionally stable materials.

5. The device as claimed in claim 4, wherein said frame, said supporting elements, and said spacers are made from metal.

6. The device as claimed in claim 1, wherein said supporting elements located proximate opposite ends of respective longitudinal sides are laterally offset from one another by a distance which allows said supporting elements to fold down longitudinally without contacting each other.

7. The device as claimed in claim 1, wherein the length of each of said supporting elements is not greater than the length of the longitudinal side of said frame.

8. The device as claimed in claim 1, further comprising transverse struts connecting said first and second supporting elements, and said third and fourth supporting elements, respectively, and wherein said holding elements are mounted on said struts centrally relative to said lateral sides of said frame.

9. The device as claimed in claim 1, further comprising a transverse strut connecting longitudinal sides of said frame.

10. A reusable transport and packaging device for transporting mechanically sensitive rolls, comprising:

(A) a rectangular base frame having two longitudinal sides and two lateral sides;

(B) supporting elements which are mounted on said base frame, which extend above said base frame, and which are pivotable downwardly onto said base frame; and (C) holding elements which are supported by said supporting elements and which provide for stationary mounting of said rolls;

wherein said supporting elements comprise first and second supporting elements located adjacent corners of a first longitudinal end of said frame and third and fourth supporting elements located adjacent corners of a second longitudinal end of said frame;

wherein said first and third supporting elements are located adjacent a first lateral edge of said frame and are laterally offset from one another by a distance which allows said first and third supporting elements to fold down longitudinally without contacting each other, and wherein said second and fourth supporting elements are located proximate a second lateral edge of said frame and are laterally offset from one another by a distance which allows said second and fourth supporting elements to fold down longitudinally without contacting each other.

11. The device as claimed in claim 10, wherein said first supporting element is located further from said first lateral edge of said frame than said third supporting element and said fourth supporting element is located further from said second lateral edge of said frame than said second supporting element.

* * * * *